United States Patent [19]
Hitomi et al.

[11] Patent Number: 5,063,899
[45] Date of Patent: Nov. 12, 1991

[54] INTAKE SYSTEM FOR MULTI-CYLINDER INTERNAL COMBUSTION ENGINE

[75] Inventors: Mitsuo Hitomi, Hiroshima; Kiyotaka Mamiya; Tomomi Watanabe, both of Higashihiroshima, all of Japan

[73] Assignee: Mazda Motor Corporation, Hiroshima, Japan

[21] Appl. No.: 620,863

[22] Filed: Dec. 4, 1990

[30] Foreign Application Priority Data

Dec. 6, 1989 [JP] Japan ................................ 1-317155

[51] Int. Cl.⁵ .......................... F02M 3/00; F02B 75/18
[52] U.S. Cl. .............................. 123/339; 123/52 MB; 123/52 MV
[58] Field of Search ................ 123/339, 52 MB, 585, 123/586, 587, 432, 52 M, 52 MV

[56] References Cited

U.S. PATENT DOCUMENTS

| | | | |
|---|---|---|---|
| 4,738,233 | 4/1988 | Hitomi et al. | 123/52 MB |
| 4,974,568 | 12/1990 | Cser | 123/52 MB |
| 5,000,130 | 3/1991 | Yamada | 123/339 |
| 5,002,021 | 3/1991 | Nakada et al. | 123/52 MB |

FOREIGN PATENT DOCUMENTS 60-88062 6/1985 Japan .
64-15439 1/1989 Japan .

*Primary Examiner*—Raymond Nelli
*Attorney, Agent, or Firm*—Fleit, Jacobson, Cohn, Price, Holman & Stern

[57] ABSTRACT

An intake system for a multi-cylinder internal combustion engine having an intake manifold that is made up of a common intake passage and separate intake passages that branch off from the common intake passage and connect to intake ports of the engine cylinders. An upstream throttle valve is located in the common intake passage. Downstream throttle velves located in the separate branched intake passages near the intake ports. A controller controls intake air actually introduced into the cylinder by actuating the downstream throttle valves to throttle down, smaller than the upstream throttle valve in a light engine load range and by actuating the upstream throttle valve to throttle down smaller than the downstream throttle valves in a heavier engine load range.

13 Claims, 2 Drawing Sheets

INTAKE SYSTEM FOR MULTI-CYLINDER INTERNAL COMBUSTION ENGINE

FIELD OF THE INVENTION

The present invention relates to an intake system for an internal combustion engine and, more particularly, to an intake system for a multi-cylinder engine which is equipped with throttle valves in separate intake passages for the several cylinders, respectively.

BACKGROUND OF THE INVENTION

In order for a multi-cylinder internal combustion engine to have well controlled engine discharge responsiveness to acceleration or deceleration, the intake system needs to be able to vary the capacity or volume of an intake passage by a throttle valve in accordance with engine operating conditions. For this purpose, some of this kind of intake systems are provided with throttle valves in separate intake passages near intake ports of the cylinders, respectively, in addition to a main throttle valve.

For another purpose, intake systems for use with multi-cylinder internal combustion engines equipped in particular with superchargers are provided with open-and-shut, or switching, valves in the separate intake passages near the intake ports of the cylinders, respectively. This switching valve serves to shut intake air into the cylinders under light engine loads and prevent a reflux of combustion gas, as dilution gas, into the intake passage. This is desirable, because in a typical design of an internal combustion engine with a supercharger a valve overlap period is used. That is the intake valve is opened earlier and the exhaust valve is closed late so that for a period of time both intake and exhaust valves are open. The result is to harness or utilize the moving mass of exhaust flow as a sort of vacuum cleaning effect not only to draw out residual combustion gasses in a combustion chamber, but also, thereby to help initiate fuel induction flow. In such an internal combustion engine, the exhaust gas or gasses reflux in excess into the intake passage especially under light engine loads when manifold pressure delivered by the supercharger is lowered due to the longer valve overlap period, so that an inordinate amount of dilution gas is produced and as a result, deteriorates combustion stability. Such an intake system is known from, for instance, Japanese Unexamined Patent Publication No. 64-15439.

When using an intake system, with throttle valves in the separate branch intake passages, of an internal combustion engine not equipped with a supercharger, the capacity or volume of each separate branch passage downstream the throttle valve (which is hereinafter referred to as effective downstream volume), is small because no interactive pressure is produced among the cylinders, and therefore, intake port pressure rises and reaches almost atmospheric pressure immediately before the valve overlap period or the beginning of opening of the intake. Accordingly, the combustion or exhaust gas, being returned as reflux into the separate branch passage during the valve overlap period, decreases under light engine loads, resulting in a decrease in combustion or exhaust gas consumed as dilution gas during a following intake cycle, so as thereby to improve the stability of combustion.

On the other hand, under heavy engine loads when the engine provides a good deal of power, it is desirable to increase the reflux of combustion gas to some extent for the purpose of reducing harmful emissions including oxides of nitrogen (NOx) or dropping pumping loss so as to improve fuel economy. Nevertheless, the smallness of the effective downstream volume of the separate intake passage, due to the provision of the throttle valve in the separate intake passage, causes a lack of the reflux of combustion or exhaust gas into the separate passage under the heavy engine loads.

To provide an increase in dilution gas, it is thought to close the exhaust valve even later so as to return combustion gas that has been drawn out into an exhaust passage, into the combustion chamber during transition from exhaust to intake cycle and thereby to increase the dilution gas. However, this technique causes dilution gas to increase even under light engine loads and as a result, the stability of combustion is adversely effected.

As is apparent from the above discussion, it is difficult for this kind of intake systems to provide a desired amount of dilution gas and a favorable stability of combustion for both light and heavy engine loads.

SUMMARY OF THE INVENTION

It is, therefore, a primary object of the present invention to provide an intake system for use with multi-cylinder internal combustion engine, such as an in-line multi-cylinder internal combustion engine, or a V-type or horizontal-type internal combustion engine, that ensures a sufficient amount of dilution gas under heavy engine loads without producing an adverse effect on the stability of combustion under light engine loads.

An intake system according to the present invention is used particularly with a multi-cylinder internal combustion engine adapted or designed to have a valve overlap period wherein the time required for an intake valve to open before a cylinder reaches a top dead center is longer than the time required to close after the cylinder has reached the top dead center. The intake manifold of the novel intake system comprises a common intake passage and separate intake passages, each of which branches off from the common intake passage and is connected to the intake port of each cylinder of the internal combustion engine. The intake manifold is provided with an upstream throttle valve disposed in the common intake passage before it branches into the separate intake passages and downstream throttle valves disposed in the separate intake passages, respectively, near the intake ports. The upstream and downstream throttle valves are controlled by control means to throttle intake air into the cylinders so as to open the downstream throttle valves smaller or less than the upstream throttle valve for a light engine load range or the upstream throttle valve smaller or less than the downstream throttle valves for a heavy engine load range, which term includes both middle and heavy engine loads. That is, intake air actually introduced into the cylinder is throttled by the downstream throttle valves during the light engine load range or by the upstream throttle valve during the heavy engine load range.

BRIEF DESCRIPTION OF THE DRAWINGS

The above and other object and features of the present invention will be apparent to those skilled in the art from the following description of preferred embodiments thereof when considered in conjunction with the appended drawings, wherein similar reference numerals have been used to designate the same or similar elements throughout the drawings, and in which.

DETAILED DESCRIPTION OF THE PREFERRED EMBODIMENT

Because, in general, the structure of an internal combustion engine is well known to those skilled in the art, the following description is directed to particular elements forming part of, or cooperating with, the novel structure in accordance with the present invention. It is to be understood that the elements not specifically shown or described can take various forms well known to those skilled in the vehicle art.

Figure 1:
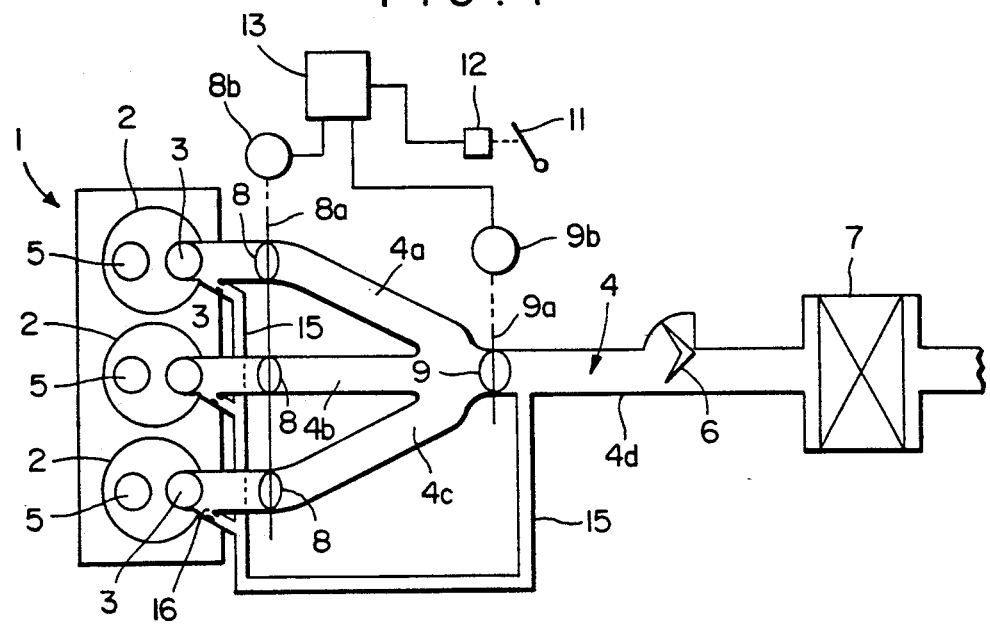
FIG. 1 is a schematic illustration of an intake system in accordance with a preferred embodiment of the present invention.

Referring to the drawings in detail, in particular to FIG. 1, an in-line three cylinder internal combustion engine 1 having an intake system in accordance with a preferred embodiment of the present invention is shown. The in-line three-cylinder internal combustion engine 1 has three cylinders 2, intake ports 3 and exhaust ports 5 opening into the cylinders 2, respectively. The intake system includes an air flow meter 6, an air cleaner 7 and an intake manifold or duct 4 from which three downstream separate intake ducts or passages 4a-4c, are branched each passage being connected to an intake port 3.

The intake manifold 4 is provided with a primary or upstream throttle valve 9 disposed immediately before the branching (three branches) transitional duct or passage 4e which is connected on the upstream side with upstream common intake passage 4d and on the downstream side the three branches of the transition piece 4e connect, respectively, to the separate intake passages 4a-4c. The intake manifold 4 is further provided with three secondary or downstream throttle valves 8 disposed in the separate intake passage 4a-4c near the respective intake ports 3. All of the downstream throttle valves 8 are linked in common by any conventional mechanical mechanism to rotatably mounted and driven drive shaft 8a of a stepping motor 8b so as to simultaneously rotate to change in opening or position in accordance with engine loads or operated distances or physical positions of an accelerator foot operated pedal 11. The upstream throttle valve 9 is linked by a conventional mechanical mechanism to drive shaft 9a of a stepping motor 9b similarly constituted so as also to rotate to change in opening or position, differently or independently from the downstream throttle valves 8, in accordance with engine loads or operated positions of any controlling element such as accelerator pedal 11 between idle and full acceleration positions. A position sensor 12, such as a potentiometer, cooperates with the acceleration pedal 11 to give an indication of the position of pedal 11 and to send an appropriate signal to a control module 13 which receives the operated or sensed position of the acceleration pedal 11 as an input. The control module 13, when receiving the signal from the position sensor 12, in response controls motion of both of the stepping motors 8a and 8b to operate or position each downstream throttle valve 8 and the upstream throttle valve 9 separately or in a predetermined relation to open or close independently or differently to different degrees in a manner as will be described in detail later.

An air inlet duct or passage 15 branches off from the upstream passage 4d of the intake manifold 4 upstream of or before the upstream throttle valve 9. Passage 15 branches off into three downstream separate inlet passages or ducts 15a-15c, each branching off from the downstream portion of the air inlet passage 15 and connecting to a separate intake passage 4a, 4b or 4c near the intake port 3 downstream of the associated valve 8. Each passage 15a-15c is provided with an orifice 16 therein. The air inlet passage 15 allows intake air to bypass the upstream and downstream throttle valves 9 and 8 and flow directly into the cylinders 2, so as to supplementarily supply air sufficiently to maintain the engine at a desirable idle speed when at least the downstream throttle valves 8 are in the idle position.

Figure 2:
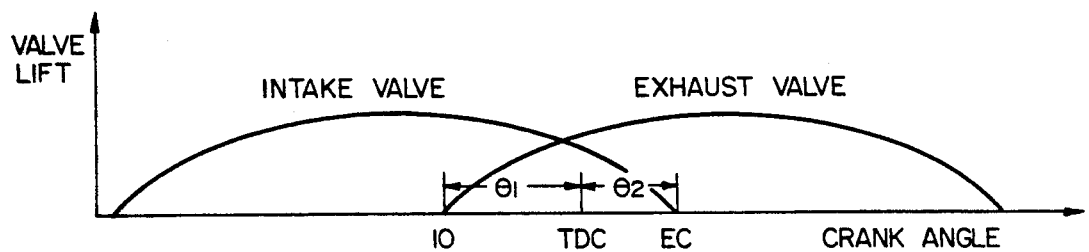
FIG. 2 is a diagram showing a valve overlap period between intake and exhaust valves.

Intake and exhaust valves (not shown but well known in the art) for each cylinder 2 are timed so that the intake valve is opened early (earlier than usual) and the exhaust valve is closed late (later than usual). This produces a valve overlap period with both valves open during the overlap period as is shown in FIG. 2. In detail, the intake valve is timed to be opened at crank angle IO smaller or less by an initial opening angle Θ1 than top dead center angle TDC; the exhaust valve is timed to be closed at crank angle EC larger or greater by final closing angle Θ2 than top dead center angle TDC. Both valves are simultaneously open for at least that predetermined time period determined by the time required for the crank of the engine to rotate through the angle or angular difference between the crank angles IO and EC. The initial opening angle or angular rotation Θ1 is set larger or greater than the final closing angle or angular rotation Θ2 of the crank of the engine relative to the particular cylinder 2 under consideration.

Figure 3:
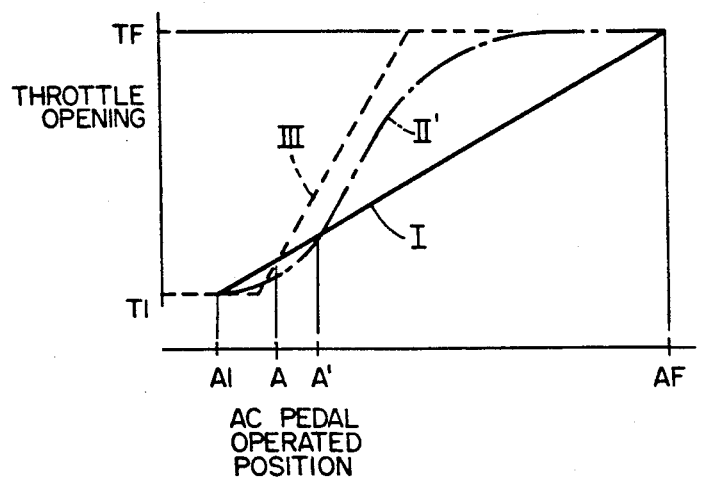
FIG. 3 is a diagram showing throttle opening curves relative to acceleration pedal operated position.

As is shown in FIG. 3, the throttle valves 8 and 9 are controlled to change opening, basically from an idle position (TI) to a full throttle position (TF), in accordance with engine loads or operated positions of the acceleration pedal (AC pedal) 11 between the idle position (AI) and the full acceleration position (AF). In particular, the upstream throttle valve 9 is designed to change its opening, from the idle to full throttle position, linearly or proportionally to the change of operated position of the accelerator pedal 11 as is shown by a solid control line I in FIG. 3. Each downstream throttle valve 8 is designed to delay or retard the start of opening and reach the full throttle position early. This is done by the controller 13 actuating the stepping motor 8b to force the downstream throttle valves 8 to stay at idle position TI, closed or throttled while the accelerator pedal 11 changes from the idle position (AI) to a short operated position; to change its opening sharply and linearly or proportionally (opening increases) to the full throttle position (TF) while the accelerator pedal 11 changes from the short operated position and middle operated position; and to be maintained in the full throttle position (TF) between the middle operated position to the full acceleration position (AF) of the accelerator pedal 11, as is shown by a chained or dash control curve II in FIG. 3.

In a light load range that is defined between the idle position (AI) and an operated position A of the accelerator pedal 11 where both throttle valves 8 and 9 open to the same throttle opening by control module 13, the downstream throttle valves 8 are smaller or less in throttle opening than the upstream throttle valve 9, so that intake air aspirated into or entering the separate intake passages 4a–4c is controlled by the downstream throttle valve 8. On the other hand, in a heavy engine load range beyond the operated position A of the accelerator pedal 11, the upstream throttle valve 9 is smaller or less in throttle opening than the downstream throttle valves 8, so that intake air into the separate intake passages 4a–4c is controlled by the upstream throttle valve 9.

Otherwise, each downstream throttle valve 8, if desired, may be operated to change its opening gently, but partly sharply, from the idle position (TI) to the full throttle position (TF) over all positions of the accelerator pedal 11 as is shown by a dot-dash control curve II' in FIG. 3. Like control curve II, by operating control module 13 according to the control curve II; the downstream throttle valves 8 are controlled to be smaller or less in throttle opening than the upstream throttle valve 9 in a light load range that is defined between the idle position (AI) and the operated position A' of the accelerator pedal 11 where both throttle valves 8 and 9 open to the same throttle opening so that in a light load range the downstream throttle valves 8 control intake air aspirated into or entering the separate intake passages 4a–4c. The upstream throttle valve 9 is controlled by control module 13 to be smaller or less in throttle opening than the downstream throttle valves 8 in a heavy engine load range beyond the operated position A' of the accelerator pedal 11 to position AF so that the upstream throttle valve 9 controls intake air into the separate intake passages 4a–4c.

In the operation of the intake system shown in the drawings and described above, because in the valve overlap period, the initial opening angle Θ1 defined between the crank angle IO at which the intake valve begins to open and the top dead center angle TDC is set longer or larger than the final closing angle Θ2 defined between the top dead center angle TDC and the crank angle EC at which the exhaust valve closes completely, the intake valve of the cylinder, whose intake and exhaust valves are in the valve overlap period, is opened early at the transition of engine cycle from intake to exhaust, so as to allow residual combustion gas in the combustion chamber of the cylinder 2 to be aspirated into the associated separate intake passage 4a, 4b or 4c of the respective cylinder 2 and to deliver the combustion gas into the combustion chamber during the intake cycle. Furthermore, because the exhaust valve is closed relatively early after the intake valve reaches the top dead center angle TDC, the combustion gas, having been drawn out into an exhaust passage, is less aspirated into the combustion chamber of the cylinder 2.

Under the light engine loads, for instance when idling, the downstream throttle valves 8 for the cylinders 2, whose openings are controlled to be smaller or less than that of the upstream throttle valve 9, practically control the amount of intake air flowing into the separate intake passages 4a, 4b and 4c of the intake manifold 4 to decrease the effective downstream volume of each intake air passage 4a, 4b or 4c. In other words, to shorten the effective length of each separate passage 4a, 4b or 4c, ranging from the downstream throttle valve 8 to the intake port 3. This results in an decrease in the reflux of combustion gas into the separate intake passages 4a–4c, to decrease or suppress dilution gas in the cylinders 2 and thereby to ensure a well controlled combustion stability of fuel mixture during idling.

Assuming that under the light engine load range, the upstream throttle valve 9 is controlled to throttle air into the separate intake passages 4a–4c, each separate passage 4a, 4b or 4c is effectively lengthened, ranging from the upstream throttle valve 9 to the intake port 3, so that the effective downstream volume of each intake air passage 4a, 4b or 4c becomes large, too large, relative to the volume of the flow of intake air in the intake air passages 4a, 4b or 4c. The intake port 3 of each cylinder 2 is affected by negative pressure caused by the operation of the other cylinders 2. As a result, the port pressure at intake port 3 does not rise to atmospheric pressure at the moment the intake valve of the cylinder 2 opens or immediately before the valve overlap period begins and a large difference in pressure is caused between intake port and exhaust port of the same cylinder 2. This causes a large amount of combustion gas to reflux, or be drawn out, into the separate intake passage and is aspirated, as dilution gas, into the combustion chamber of the cylinder 2 during the following intake stroke. This leads to a decreased amount of fresh intake air and hence to lowering the efficiency of the combustion of fuel mixture, thereby worsening combustion stability of fuel mixture during idling.

In contrast with this, in the intake system of the present invention wherein the downstream throttle valves 8 are controlled to throttle air into the separate intake passages 4a–4c under light engine loads, each separate passage 4a, 4b or 4c is shortened in effective length, ranging from the downstream throttle valve 8 to the intake port 3 and therefore, the effective downstream volume of each intake air passage 4a, 4b or 4c becomes small, when decreasing the opening of the downstream throttle valves 8 under light engine loads. As a result, the port pressure at intake port 3 rises almost to atmospheric pressure at the moment the intake valve of the cylinder 2 opens or immediately before the valve overlap period starts. As a result only a small difference in pressure is caused between the intake port and exhaust port of the same cylinder 2. The amount of combustion gas allowed to reflux, or be drawn out, into the separate intake passage and thereafter aspirated, as dilution gas, into the combustion chamber of the cylinder 2 during the following intake stroke is considerably decreased. This leads to an increase in aspirating fresh intake air in to the combustion chamber of the cylinder 2 and hence to increasing the efficiency of the combustion of fuel mixture, thereby to ensure an improved combustion stability of fuel mixture during idling.

In a heavy engine load range including middle or moderate engine loads, the upstream throttle valve 9 is controlled by control module 13 to provide an opening smaller or less than that of the downstream throttle valves 8 and to throttle air introduced into the separate intake passages 4a–4c. This results in an effective lengthening of each separate passage 4a, 4b or 4c, ranging from the upstream throttle valve 9 to the intake port 3, so that the effective downstream volume of each intake air passage 4a, 4b or 4c becomes large. Accordingly, each separate intake passage allows not only a large amount of combustion gas to reflux thereinto but also combustion gas to flow back into the other separate intake passages. Therefore, combustion gas can be aspirated through the transitional portion of the intake passage 4, to increase dilution gas flowing into the combustion chamber of each cylinder 2 during its operation.

Assuming, similarly to the case of light engine loads, that under the heavy engine load range, the downstream throttle valve 8 is controlled to throttle air into each separate intake passage 4a, 4b or 4c, each separate passage 4a, 4b or 4c is shortened in effective length, ranging from the downstream throttle valve 8 to the intake port 3 and the effective downstream volume of each intake air passage 4a, 4b or 4c becomes small. As a result, only a small amount of combustion gas is allowed to reflux, or be drawn out, into the separate intake passage, resulting in a lack or shortage of dilution gas in the combustion chamber of the cylinder 2. This leads to adversely affecting efficiency of the combustion of fuel mixture and less control of emission. On the other hand, the port pressure of the intake port rapidly drops when a piston moves down after the intake valve has opened. The engine is affected by load that is produced accompanying the down motion of the piston against the rapid drop of the port pressure and therefore, increases pumping loss.

In contrast with this, in the intake system of the present invention wherein the upstream throttle valve 9 is controlled to throttle air into the separate intake passages 4a-4c under the heavy engine load range, each separate passage 4a, 4b or 4c is lengthened in effective length, ranging from the upstream throttle valve 9 to the intake port 3 and therefore, the effective downstream volume of each intake air passage 4a, 4b or 4c becomes large when decreasing the opening of the upstream throttle valve 9 under the heavy or middle engine loads. As a result, a sufficient amount of dilution gas is introduced in the combustion chamber of the cylinder 2 and well controlled emission is realized. Additionally, the upstream throttle 9 is opened smaller than the downstream throttle valve 8 if used to throttle air in order to provide an equivalent output power, so as to weaken the negative port pressure of the intake port and thereby to decrease pumping loss. Moreover, the drop of port pressure of the intake port accompanying the down motion of the piston occurs more gently and the port pressure of the intake port reaches a higher value compared to throttling air by the downstream throttle valve 8, so as to decrease the engine load accompanying the down motion of piston and hence pumping loss. As apparent from the above, throttling intake air by the upstream throttle valve 9, in the heavy engine load range including middle engine loads, increases dilution gas, so as to realize good control of emission and improved fuel economy.

Because intake air leaks through the downstream throttle valves 8 due to manufacturing and installation inaccuracy, it is generally quite difficult to distribute intake air uniformly among the cylinders 2. The intake system can distribute intake air substantially uniformly among all of the cylinders 2 by supplying supplemental air, whose amount is precisely controlled by the orifices 16, through separate inlet passages 15a-15c when idling. It is relatively easy to manufacture the orifices 16 with sufficient accuracy and therefore, to design them to prevent combustion gas in the separate intake passages for some cylinders from being aspirated into another cylinder which is in the intake cycle.

Figure 4:
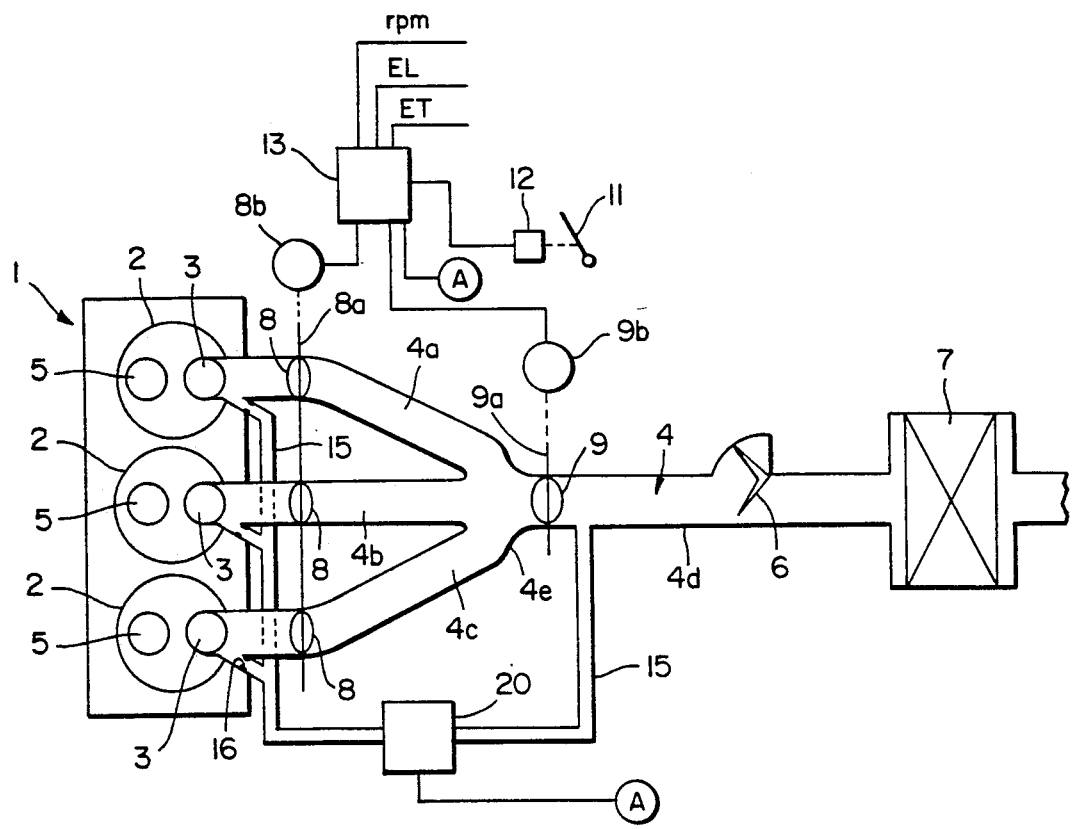
FIG. 4 is a schematic illustration showing a variant of the intake system of FIG. 1.

To more precisely control the amount of supplemental air to be supplied to the cylinders 2 when idling, it is desirable to replace the orifices 16 with an idle speed control (ISC) valve, which is well known in structure and operation to those skilled in the art. As is shown in FIG. 4, an ISC valve 20 is disposed in the inlet passage 15 upstream of the separate inlet passages 15a-15c and is controlled by the control module 13 via output-input (A) based on engine operating conditions, such as engine speed (rpm), engine temperature (ET), additional engine loads (EL) of an air conditioner and/or a power steering system, etc. These conditions are detected in a manner well known to those skilled in the art.

Figure 5:
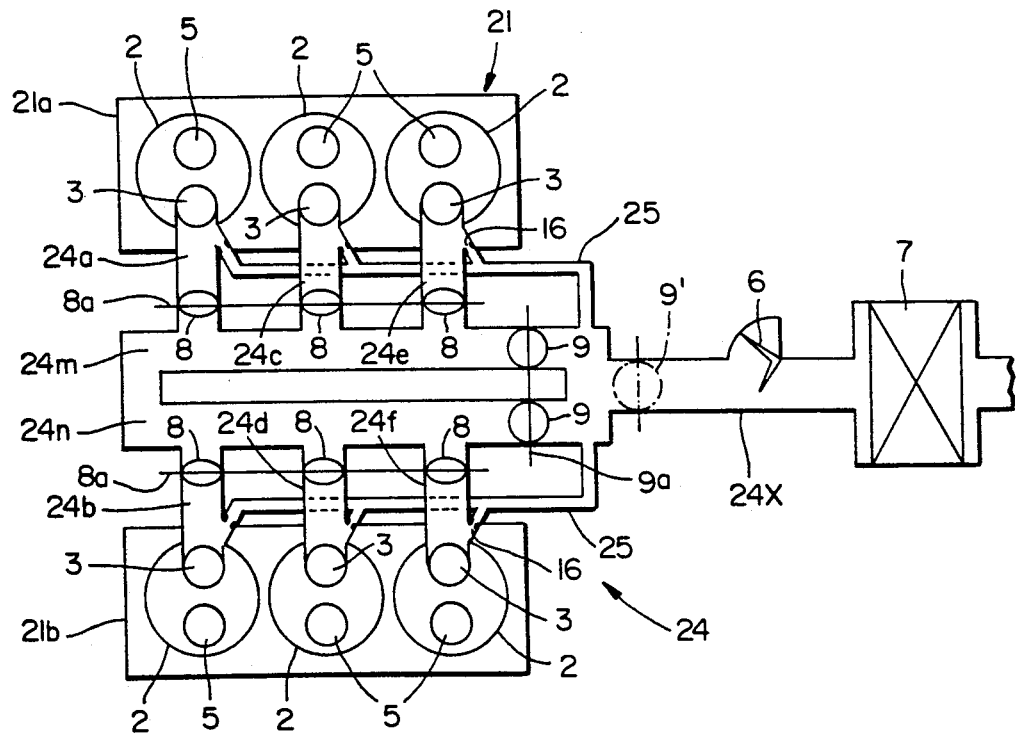
FIG. 5 is a schematic illustration of an intake system in accordance with another preferred embodiment of the present invention.

Referring to FIG. 5, an intake system in accordance with another preferred embodiment of the present invention, suitably incorporated with a V-6 type internal combustion engine, is shown. A V-6 internal combustion engine 21 consists of a pair, or first and second, banks 21a and 21b set at an angle to each other including a plurality of, for example three in this embodiment, cylinders 2 in each bank 21a or 21b which do not fire one after another. The engine 21 is provided with an intake and an exhaust port 3 and 5 for each cylinder 2. An intake system includes an intake manifold 24 comprising a main or common intake passage portion 24x and a pair, or first and second, collector passages 24m and 24n, branching off from the common intake passage portion 24c and communicating with each other at downstream ends thereof, for the first and second banks 21a and 21b. Each collector passage 24m or 24n has separate intake passages 24a, 24c and 24e, or 24b, 24d and 24f, each branching off from the collector passage 24m or 24n and being connected to an intake port 3.

The intake manifold 24 is provided with primary or upstream throttle valves 9 disposed in the collector passages 24m and 24n, respectively, immediately after the common intake passage portion 24x. The intake manifold 24 is further provided with six secondary or downstream throttle valves 8 disposed in the separate intake passage 24a-24f, respectively, near the intake ports 3. All downstream throttle valves 8 are linked to a drive shaft 8a of stepping motor 8b (not shown) so as to simultaneously change in opening in accordance with engine loads or operated positions, between the idle and full acceleration position, of an acceleration pedal in the same manner as described as to the previous embodiment. Similarly, the upstream throttle valve 9 is linked to a drive shaft 9a driven by a stepping motor (not shown) so as to simultaneously, but differently operate relative to or from the downstream throttle valves 8, changing in opening in accordance with engine loads or operated positions, between the idle and full acceleration position, of the acceleration pedal in the same manner as described in the previous embodiment. The upstream and downstream throttle valves 9 and 8 are controlled to open according to the curves shown in FIG. 3.

Air inlet passages 25 branch off from the collector passages 24m and 24n of the intake manifold 24 before or upstream of the upstream throttle valves 9, respectively. Each air inlet passage 25 has three downstream separate inlet passages 25a with orifices 16, each separate inlet passages 25a being connected to the separate intake passage 24a, 24b, 24c, 24d, 24e or 24f near and downstream of its associated intake port 3. The air inlet passage 25 allows intake air to bypass the upstream and downstream throttle valves 9 and 8 and flow into the cylinders 2, so as to supplementarily supply air sufficiently to maintain the engine at a desirable idle speed when at least the downstream throttle valves 8 are in the idle position.

The engine 21 has intake and exhaust valves (not shown but well known in the art) for each cylinder 2. These intake and exhaust valves are timed so that the intake valve is opened early and the exhaust valve is closed late as is shown in FIG. 2 and described in the previous embodiment. Similarly to the in-line three-cylinder internal combustion engine of the previous embodiment, the intake and exhaust valves of the V-type six-cylinder internal combustion engine 21 are designed to have a valve overlap period wherein the initial opening angle $\Theta 1$ is set larger than the final closing angle $\Theta 2$.

The operation of the intake system shown in FIG. 5 is basically the same as that of the previous embodiment. During idling, while the downstream throttle valves 8 are simultaneously controlled to throttle air flow into the cylinders 2, a precisely controlled amount of supplemental air is supplied to and uniformly distributed among the cylinders 2 through the idling air inlet passages 25 with the orifices 16 Due to throttling intake air into the separate intake passages $24a-24f$ by the downstream throttle valves 8 under the light engine load range, the separate passages $24a-24f$ are shortened in effective length and therefore, the effective downstream volume of the intake air passages $24a-24f$ becomes small under the light engine loads. As a result, the amount of dilution gas introduced in the combustion chamber of the cylinder 2 is reduced and the stability of combustion is ensured.

Under the heavy engine load range including middle or moderate engine loads, the upstream throttle valves 9 are controlled to throttle intake air into the separate intake passages $24a-24f$, each separate passage being lengthened in effective length and the effective downstream volume of the separate intake passage $24a-24c$ become larger. Accordingly, each separate intake passage allows not only a sufficient amount of combustion gas to reflux thereinto but also combustion gas having flowed back into the other separate intake passage to be aspirated thereinto through the collector intake passage $24m$ or $24n$ of the intake manifold 24, thereby increasing dilution gas in the combustion chamber of the cylinder 2, so as to contribute to realizing good control of emission and improved fuel economy.

The collector intake passages $24m$ and $24n$ communicated with each other at the downstream ends thereof decrease the resistance of air flow, in particular, over the downstream parts thereof, to provide decreased differences in charging efficiency among the cylinders 2.

It is apparent in this embodiment, to more precisely control the amount of supplemental air to be supplied to the cylinders 2 when idling, the orifices 16 may be replaced with a single idle speed control (ISC) valve. Furthermore, the two upstream throttle valves 9 may be replaced with a single throttle valve 9' (shown in phantom) disposed in the common intake passage portion $24c$ of the intake manifold 24.

It is to be understood that although the invention has been described in detail with respect to preferred embodiments thereof, various other embodiments and variants are possible which fall within the spirit and scope of the invention, and such embodiments and variants are intended to be covered by the following claims.

What is claimed is:

1. An intake system for a multi-cylinder internal combustion engine provided with a valve overlap period wherein a time required for an intake valve to open before a cylinder reaches a top dead center has been set longer that a time required to close after said cylinder has reached said top dead center, said intake system comprising:
   an intake manifold comprising a common intake passage and separate intake passages, each said separate intake passage branching off from said common intake passage and being connected to an intake port of each cylinder of said internal combustion engine;
   an upstream throttle valve disposed in said common intake passage before branching of said separate intake passages;
   a downstream throttle valve disposed in each said separate intake passage; and
   control means for controlling said upstream and downstream throttle valves to throttle intake air into said cylinder by said downstream throttle valve in a light engine load range and by said upstream throttle valve in a heavier engine load range.

2. An intake system as defined in claim 1, wherein said control means controls said downstream throttle valve to open smaller than said upstream throttle valve in said light engine load range and said upstream throttle valve to open smaller than said downstream throttle valve in said heavier engine load range.

3. An intake system as defined in claim 2, further comprising a passage with idle speed control means bypassing said upstream and each said downstream throttle valves for providing supplementary intake air flow from said common intake passage into said separate intake passages for idle speed control.

4. An intake system as defined in claim 3, wherein said idle speed control means comprises an idle control valve controlled responsive to engine speed and engine temperature.

5. An intake system as defined in claim 3, wherein said idle speed control means comprises an orifice.

6. An intake system for an internal combustion engine having two rows of cylinders, each said row of cylinders being arranged not to fire one after another, and characterized by a valve overlap period wherein time required for an intake valve to open before a cylinder reaches a top dead center is set longer that time required to close after said cylinder has reached said top dead center, said intake system comprising:
   an intake manifold comprising a common intake passage, a collector intake passage for each said row of cylinders connected in common to said common intake passage and separate intake passages, each said separate intake passage branching off from one of said collector intake passages and being connected to an intake port of one of said cylinders of said internal combustion engine;
   an upstream throttle valve disposed in said intake manifold upstream of said separate intake passages;
   a downstream throttle valve disposed in each said separate intake passage; and
   control means for controlling said upstream and downstream throttle valves to throttle intake air into said cylinders by said downstream throttle valves in a light engine load range and by said upstream throttle valve in a heavier engine load range.

7. An intake system as defined in claim 6, wherein said control means controls said downstream throttle valves to open smaller than said upstream throttle valve in said light engine load range and said upstream throttle valve to open smaller than said downstream throttle valve in said heavier load range.

8. An intake system as defined in claim 7, wherein an upstream throttle valve is disposed in each said collector intake passage upstream of said separate intake passages;

9. An intake system as defined in claim 7, wherein said upstream throttle valve is disposed in said common intake passage.

10. An intake system as defined in claim 7, wherein said collector passages communicate with each other at their downstream ends.

11. An intake system as defined in claim 7, further comprising a passage with idle speed control means bypassing said upstream throttle valve and each said downstream throttle valve for providing supplementary intake air flow from said intake passage upstream of said upstream throttle valve into said separate intake passages for idle speed control.

12. An intake system as defined in claim 11, wherein said idle speed control means comprises an idle control valve controlled responsive to engine speed and engine temperature.

13. An intake system as defined in claim 11, wherein said idle speed control passage comprises an orifice.

* * * * *